United States Patent
Childs et al.

(10) Patent No.: US 9,413,770 B2
(45) Date of Patent: Aug. 9, 2016

(54) CLOUD BASED APPLICATION ACCOUNT MANAGEMENT

(71) Applicant: Lenovo (Singapore) Pte. Ltd., Singpaore (SG)

(72) Inventors: Philip Lee Childs, Durham, NC (US); Michael Terrell Vanover, Raleigh, NC (US); Goran Hans Wibran, Cary, NC (US); Hui Wang, Beijing (CN); Shaowei Chen, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 73 days.

(21) Appl. No.: 13/689,920

(22) Filed: Nov. 30, 2012

(65) Prior Publication Data

US 2014/0157378 A1 Jun. 5, 2014

(51) Int. Cl.
*H04L 29/06* (2006.01)

(52) U.S. Cl.
CPC .................... *H04L 63/102* (2013.01)

(58) Field of Classification Search
CPC ....... G06F 21/31; H04L 63/083; H04L 63/08; H04L 63/102; H04L 63/0815
USPC ............................................................. 726/6
See application file for complete search history.

(56) References Cited

U.S. PATENT DOCUMENTS

| | | | | |
|---|---|---|---|---|
| 5,768,119 A * | 6/1998 | Havekost | ............. | G05B 19/409 700/4 |
| 8,625,796 B1 * | 1/2014 | Ben Ayed | ..................... | 380/258 |
| 2001/0030644 A1 * | 10/2001 | Allport | ............. | G07C 9/00158 345/173 |
| 2005/0060532 A1 * | 3/2005 | Dorenbosch | ...... | H04M 1/72563 713/100 |
| 2007/0053529 A1 * | 3/2007 | Suyama | ................. | H04H 60/04 381/119 |
| 2008/0243846 A1 * | 10/2008 | Rasmussen | ....... | G06F 17/30171 |
| 2008/0263655 A1 * | 10/2008 | Muto | ..................... | G06F 21/608 726/16 |
| 2010/0011439 A1 * | 1/2010 | Takiyama | ............... | G06F 21/34 726/19 |
| 2010/0268941 A1 * | 10/2010 | Pahlavan | ............... | G06F 9/4445 713/155 |
| 2011/0093941 A1 * | 4/2011 | Liu | ..................... | G06F 9/44505 726/7 |
| 2012/0260321 A1 * | 10/2012 | Wendt | ................... | H04L 9/0863 726/5 |
| 2013/0014243 A1 * | 1/2013 | Chen | .................... | H04L 67/2804 726/8 |
| 2013/0047222 A1 * | 2/2013 | Dhanakshirur | ....... | H04L 63/105 726/4 |
| 2013/0160141 A1 * | 6/2013 | Tseng | ................. | G06F 21/6245 726/28 |
| 2014/0007205 A1 * | 1/2014 | Oikonomou | ............ | G06F 21/35 726/6 |
| 2014/0086146 A1 * | 3/2014 | Kim | ....................... | H04W 28/02 370/328 |

OTHER PUBLICATIONS

"A Mechanism to remove Client Authorization from OAuth Authorization Server" IP.com No. IPCOM000220484D, IP.com Electronic Publication: Aug. 1, 2012.*

* cited by examiner

*Primary Examiner* — Jason K. Gee
*Assistant Examiner* — Sanchit Sarker
(74) *Attorney, Agent, or Firm* — Ference & Associates LLC

(57) ABSTRACT

An aspect provides a method, including: receiving at a remote device a client log in to a cloud based account issued from a client device; determining the client device is not associated with the client log in; issuing an instruction to unbind at least one client device application log in credential and bind a cloud client log in credential to the at least one client device application; and providing an instruction to unbind the cloud client log in credential from the at least one client device application in response to at least one predetermined criteria being satisfied. Other aspects are described and claimed.

16 Claims, 4 Drawing Sheets

CLOUD BASED APPLICATION ACCOUNT MANAGEMENT

BACKGROUND

Information handling devices ("devices"), for example cell phones, smart phones, tablet devices, laptop and desktop computers, servers, etc., may be used to access, view, edit or otherwise handle data stored elsewhere, for example as accessed via a cloud-based computing solution. Cloud-based computing solutions are beginning to offer richer user experiences over and above simple data storage offerings.

As an example, LENOVO CLOUD is a cloud-based computing solution that delivers an enhanced end user experience to individuals and businesses regardless of location, e.g., at home, at work or on the move. Cloud-based solutions offer services and applications over and above content access and storage, for example encompassing a range of products and services that deliver a consistent, secure digital experience, and product enhancements for both single users and enterprises. Cloud-based solutions give users secure access to their data and applications wherever they are, without clogging up the data center or drawing on IT staff resources. This allows organizations to create a balanced approach to cloud computing that may utilize built-in, cloud ready capabilities available in LENOVO hardware, as well as allowing users secure access from any other information handling device, including but not limited to personal computers (PCs), tablets, smartphones, and the like.

BRIEF SUMMARY

In summary, one aspect provides a method, comprising: receiving at a remote device a client log in to a cloud based account issued from a client device; determining the client device is not associated with the client log in; issuing an instruction to unbind at least one client device application log in credential and bind a cloud client log in credential to the at least one client device application; and providing an instruction to unbind the cloud client log in credential from the at least one client device application in response to at least one predetermined criteria being satisfied.

Another aspect provides an information handling device, comprising: one or more processors; and a memory operatively coupled to the one or more processors that stores instructions executable by the one or more processors to perform acts comprising: receiving at a remote device a client log in to a cloud based account issued from a client device; determining the client device is not associated with the client log in; issuing an instruction to unbind at least one client device application log in credential and bind a cloud client log in credential to the at least one client device application; and providing an instruction to unbind the cloud client log in credential from the at least one client device application in response to at least one predetermined criteria being satisfied.

A further aspect provides a program product, comprising: a storage medium having computer program code embodied therewith, the computer program code comprising: computer program code configured to receive at a remote device a client log in to a cloud based account issued from a client device; computer program code configured to determine the client device is not associated with the client log in; computer program code configured to issue an instruction to unbind at least one client device application log in credential and bind a cloud client log in credential to the at least one client device application; and computer program code configured to provide an instruction to unbind the cloud client log in credential from the at least one client device application in response to at least one predetermined criteria being satisfied.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
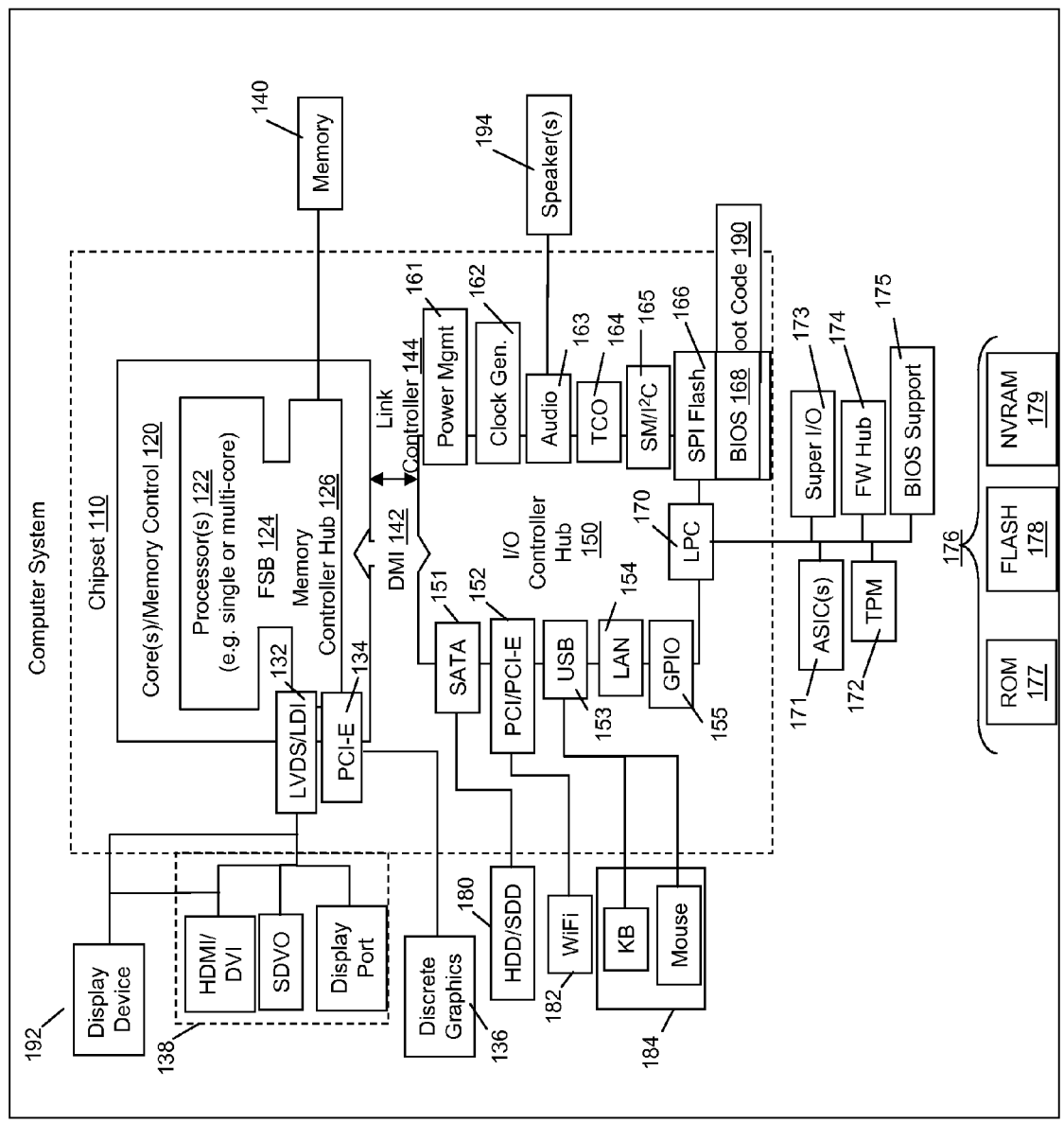
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In the context of cloud-based computing solutions, users may store a variety of content, including but not limited to log in credentials associated with devices, accounts, and applications (whether hosted in a cloud environment or as stored on a user/client device). In such contexts, users may often share client devices (e.g., smart phones, tablets, personal computers, etc.) and wish to share access to certain services (e.g., content, applications and the like), while not wishing to share others.

For example, in a cloud-based solution, when a user temporarily uses someone else's device, in the case of services and/or applications that rely on saved credentials, the temporary use may cause these applications and/or services to behave incorrectly or unexpectedly for the original user (e.g., when the device is returned). An example of this is a log out of the first user from a client device application (e.g., SKYPE voice application), with the log in of a second user (e.g., the borrowing/temporary user's log in). When the first user attempts to use the client device application, he or she may be unpleasantly surprised that the second user remains logged into the client device application and the client device application has remained in that state. Among other difficulties, this leaves the client device application in an altered state, e.g., having the second user logged in. Moreover, this necessitates the first user to manually log back into the client device application.

Accordingly, an embodiment provides for automated handling of client device application credential managing based on cloud-based account access from a particular client device. Embodiments permit a user to use a particular client device to log into a cloud-based account. On receipt of such log in and client device information, an embodiment may ascertain if the client log in (e.g., cloud credentials of the requesting user) are associated with the particular client device. If they are not, a policy may be implemented wherein certain of the client device application(s) of the client device may be permitted to log a first user out, and log the current user (i.e., the one logging into the cloud service) in, with an additional provision for unbinding of that temporary credential at the conclusion of a session, on receipt of an unbinding/re-binding instruction, based on a validity time out, etc. Such mechanism permits temporary users to be automatically and seamlessly logged into certain client device applications, and for those certain client device applications to resume their previous state after one or more predetermined criterion is/are satisfied (e.g., session end, time out, etc.).

The illustrated example embodiments will be best understood by reference to the figures. The following description is intended only by way of example, and simply illustrates certain example embodiments.

Figure 2:
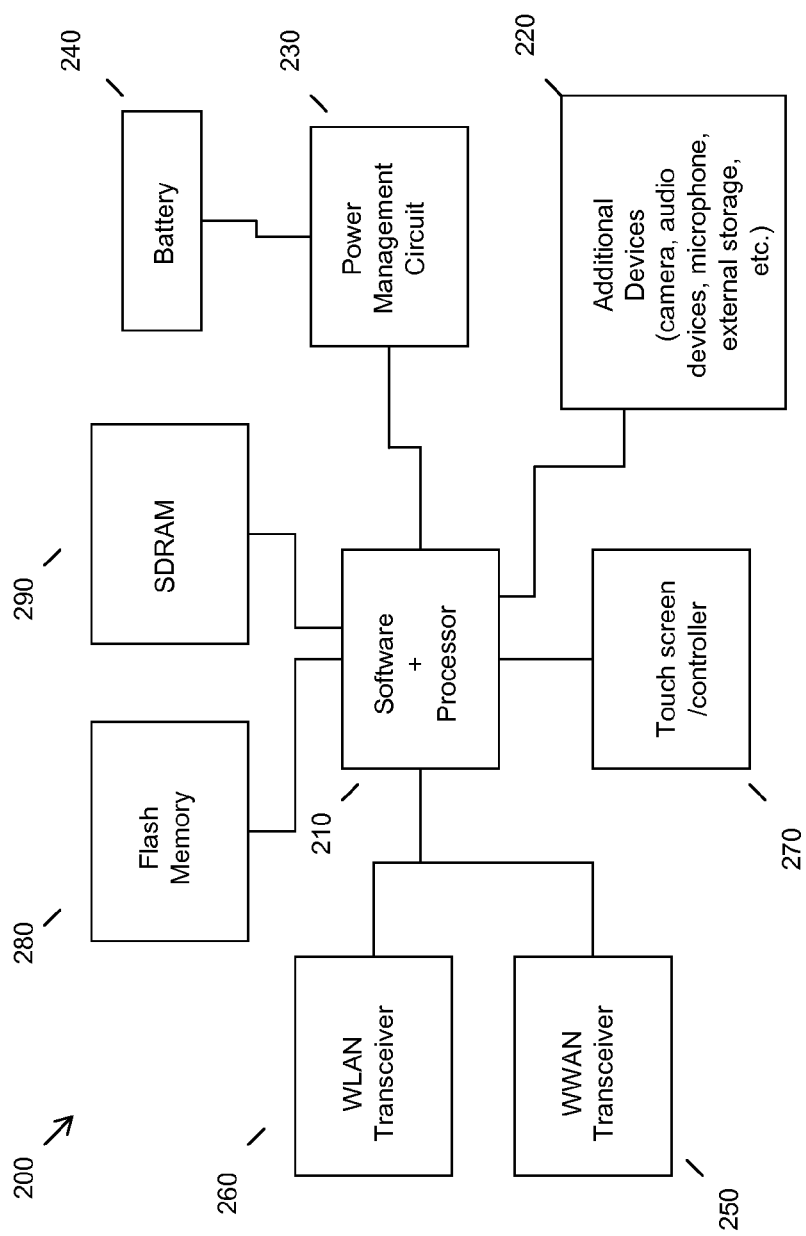
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include user devices or cloud computing devices. For example, FIG. 1 may be a device that provides a cloud computing environment with cloud-based services accessible to a user device, for example as illustrated in FIG. 2. Thus, a user may use his or her device 200 to connect to a cloud-based solution device, for example by logging into a cloud account to access data and/or services.

Figure 3:
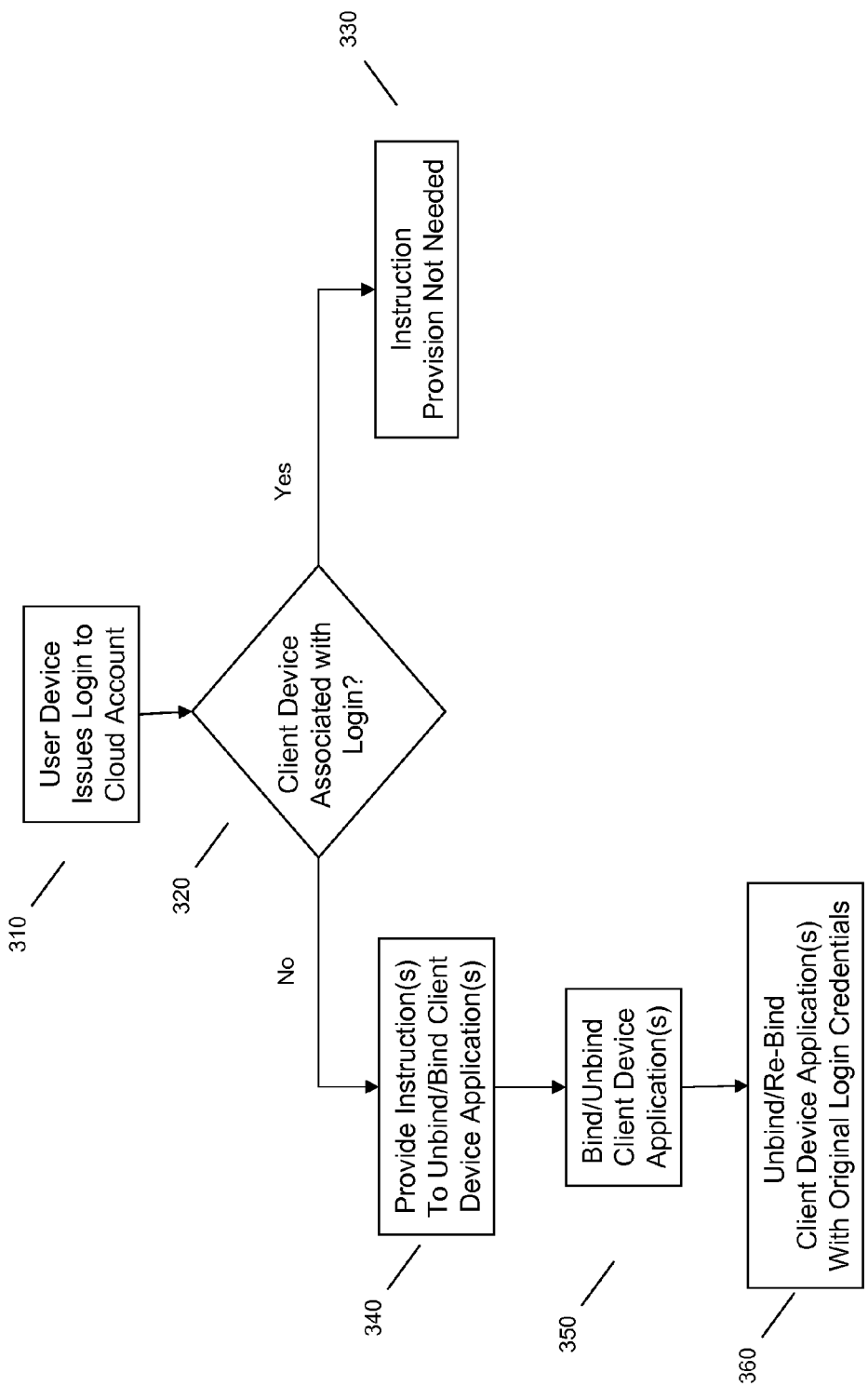
FIG. 3 illustrates an example method for binding/unbinding/re-binding certain client device applications based on cloud account access.

Referring to FIG. 3, an example method of client device application binding/unbinding/re-binding is illustrated. At 310 a user (e.g., a user borrowing another's client device) issues a log in request from that client device to a cloud account service, i.e., hosted on a remote device. The cloud account service makes a determination, e.g., based on user ID or other like identification and client device ID if the cloud account being logged into is associated with the device at 320. This allows the cloud service to determine if the user issuing the log in request is using one of his or her devices, or if this is a borrowing/temporary user. If the issuing user is the device user associated with the device in the cloud, nothing further need be done at 330.

However, if it is determined that the issued cloud log in is not associated with the client device at 320, the cloud service is thus apprised of a borrowing/temporary user situation. Here, the cloud service may facilitate a temporary change in state for certain client device applications via automatic credential managing, as follows.

At 340, the cloud service may provide one or more instructions to unbind a current user from a client device application, along with an instruction to re-bind the original credential. As an example, the instruction may include code instructing a client device side module to log out a current user from an application (e.g., a VOIP application such as SKYPE). The instruction issued at 340 may further provide a binding instruction to the client device side module to bind or log in another user, e.g., the user associated with the cloud account issuing the log in request at 310. This may be accomplished for example by looking up the cloud user's VOIP application credentials in the cloud and provisioning the same in the instruction to the client side module.

Thus, with the issuance of an unbinding/binding instruction, the client device application (e.g., VOIP application) has automatically configured the client device application for use by the current user of the client device. This satisfies the need to have an additional/separate user (e.g., a borrowing/temporary user) to be enabled to seamlessly utilize client device applications. It should be noted that the client user device issuance of a cloud log in request could be automated or semi-automated (e.g., in response to a user log in to another service on the client device or log in to the client device itself).

In any event, if the current user of the device later returns the client device to the first user (e.g., the owner of the device), the owner may be burdened with logging out the borrowing user and logging himself or herself back into the client device application (e.g., VOIP application). Thus, an embodiment may additionally provide an unbinding/re-binding instruction to the client device such that the temporary user may be logged out of the client device application and the initial (or another) user is logged into the client device application seamlessly; thus, unburdening the first or other user form logging back into the client device application. The unbinding/re-binding instruction of 350 may be included in the initial unbinding/binding instruction of 340.

For example, at 360, an embodiment may issue an unbinding/re-binding instruction to the client device. This permits the client device side module to unbind the temporary user's log in credentials from the client device application and re-bind the first user. As above, another user (e.g., a third user) may be logged into the client device application, such that multiple users may be serially logged into client device applications, with or without re-binding an initial/first user.

In any event, an embodiment provides for returning the client device application(s) to their original state, i.e., with the first user logged back into the client device applications via issuance of an instruction, e.g., at 360. As above, the unbind/re-bind instruction may be issued at a variety of times, for example it could be included in the unbind/bind instruction (a composite instruction), such that at the conclusion of a predetermined criteria (e.g., a time out of validity of the unbind/bind instruction, a log out of the borrowing user from the cloud account, etc.), the client device application is returned to its original state.

Although a VOIP application has been used as an example herein, other client device applications may be similarly managed. For example, an application such as LENOVO MAGIC SHARE (where one client device, e.g., a smart phone or tablet, utilizes another device's display screen, e.g., a television, to share content) may also be subject to similar cloud-based credential management.

Figure 4:
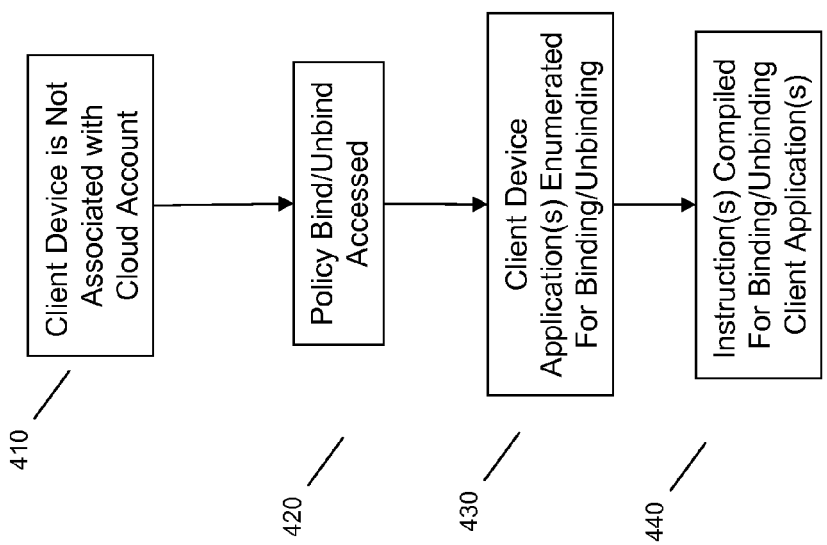
FIG. 4 illustrates an example policy-based method for selection of client device applications to bind/unbind/re-bind.

In this regard, referring to FIG. 4, an embodiment may differentiate between which client device applications are subject to such cloud-based credential managing. An embodiment may implement a policy-based cloud credential management, which may or may not be subject to user alteration.

For example, a user may not wish certain applications to be subjected to credential managing. An example of such an application may be a cloud storage synchronization client device application that synchronizes client device stored content (e.g., pictures, documents, etc.) with a cloud account. Thus, if a temporary/borrowing user logs into a cloud account, a first user (e.g., the device owner) may not want certain information synchronized to the temporary/borrowing user's cloud storage.

Accordingly, an embodiment may, on receipt of a cloud log in request at 410, ascertain a policy that differentiates which, if any, client device applications are to be subjected to credential managing as outlined herein. At 420 an embodiment accesses a bind/unbind policy, which again may be altered or changed by a user, as stored for example in a cloud based account associated with the client device that issued the cloud log in request.

At 430 the client device application(s) subject to (or not subject to) binding/unbinding may be enumerated such that at 440 an appropriate instruction for binding/unbinding may be compiled, if any. Thus, an embodiment may allow or preclude such automated credential management for various applications differentially, such as a cloud storage/synchronization application. Other extensions of this principle are of course possible, e.g., compiling an instruction allowing limited binding/unbinding of certain client device applications. This may be implemented for example in client device applications that have different tiers of access based on a credential. For example, a limited binding/unbinding instruction may grant automated access to a borrowing user of certain (sub-set) of (e.g., low priority) client device application functions.

Accordingly, various embodiments permit for cloud-based credential management of client device applications. These arrangements permit users to borrow devices, access client device applications on a limited (e.g., in time or access level) basis and further allow for the client device applications so managed to be returned to a different (e.g., initial) state in response to satisfaction of one or more predetermined criteria (e.g., end of a could session, time out, etc.). Moreover, embodiments allow users to be confident that certain applications on their client devices (e.g., cloud storage synchronization applications) will not be accessible, even if some client device applications are subject to credential managing.

While the various example embodiments have been described in connection with provisioning access to client device applications associated with cloud-based accounts, these were provided as non-limiting examples. Accordingly, embodiments may be used to provide similar functionality and services in other contexts. Similarly, although devices such as tablets, smart phones and cloud based devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at a remote device, a user client log in to a cloud based account issued from a client device;
determining, based on the receiving, the client device is not associated with the user client log in by determining a client device application log in credential is not associated with the user client log in received at the remote device;
thereafter issuing an instruction to unbind a client device application log in credential of another user account and bind a cloud user log in credential to at least one client device application;
providing an instruction to unbind the cloud user log in credential from the at least one client device application in response to at least one predetermined criteria being satisfied; and
thereafter automatically re-binding the client device application log in credential to at least one client device application to return the client device application to a previous log in state.

2. The method of claim 1, wherein the at least one predetermined criteria is receipt of a client log out request at the remote device.

3. The method of claim 1, wherein the at least one predetermined criteria is a time based validity threshold being exceeded.

4. The method of claim 1, wherein the instruction to unbind the client device application log in credential and bind a cloud user log in credential is policy based.

5. The method of claim 4, wherein the client device application log in credential to unbind is selected based on a policy.

6. The method of claim 5, wherein the policy indicates that certain client device applications are not to be unbound by the instruction.

7. The method of claim 6, wherein the certain client device applications that are not to be unbound comprise at least a cloud data synchronization application.

8. An information handling device, comprising:
one or more hardware processors; and
a memory operatively coupled to the one or more processors that stores instructions executable by the one or more processors to:

receive at a remote device, a user client log in to a cloud based account issued from a client device;

determine, based on the user client log in received, the client device is not associated with the user client log in by a determination that a client device application log in credential is not associated with the user client log in received at the remote device;

thereafter issue an instruction to unbind a client device application log in credential of another user account and bind a cloud user log in credential to the at least one client device application;

provide an instruction to unbind the cloud user log in credential from the at least one client device application in response to at least one predetermined criteria being satisfied; and thereafter automatically re-bind the client device application log in credential to at least one client device application to return the client device application to a previous log in state.

9. The information handling device of claim 8, wherein the at least one predetermined criteria is receipt of a client log out request at the remote device.

10. The information handling device of claim 9, wherein the at least one predetermined criteria is a time based validity threshold being exceeded.

11. The information handling device of claim 8, wherein the instruction to unbind the client device application log in credential and bind a cloud user log in credential is policy based.

12. The information handling device of claim 11, wherein the client device application log in credential to unbind is selected based on a policy.

13. The information handling device of claim 12, wherein the policy indicates that certain client device applications are not to be unbound by the instruction.

14. The method of claim 13, wherein the certain client device applications that are not to be unbound comprise at least a cloud data synchronization application.

15. The information handling device of claim 8, wherein the information handling device is a cloud computing device connected to the client device via a network connection.

16. A program product, comprising:

a storage device having computer program code embodied therewith, the computer program code being executable by a processor and comprising:

computer program code that receives at a remote device, a user client log in to a cloud based account issued from a client device;

computer program code that determines, based on the receipt of the client log in from the client device, the client device is not associated with the user client log in by determining a client device application log in credential is not associated with the user client log in received at the remote device;

computer program code that thereafter issues an instruction to unbind a client device application log in credential of another user account and bind a cloud user log in credential to the at least one client device application;

computer program code that provides an instruction to unbind the cloud user log in credential from the at least one client device application in response to at least one predetermined criteria being satisfied; and computer program code that thereafter automatically re-binds the client device application log in credential to at least one client device application to return the client device application to a previous log in state.

* * * * *